Patented Apr. 6, 1943

2,315,776

UNITED STATES PATENT OFFICE 2,315,776

FORMALDEHYDE-UREA ADHESIVE

William C. Dearing and Kenneth D. Meiser, Toledo, Ohio

No Drawing. Application May 14, 1940, Serial No. 335,116

7 Claims. (Cl. 260—9)

The invention relates to adhesives, and particularly to an improved adhesive containing a formaldehyde-urea reaction product.

Aqueous solutions of formaldehyde-urea reaction products are valuable as adhesives, because such reaction products can be converted into infusible and insoluble formaldehyde-urea resin after the adhesive has been applied, to produce a water-resistant bond. Formaldehyde-urea reaction products in aqueous solution are superior to other adhesives in the rapidity and ease with which they can be hardened into the insoluble state after being applied. Plywood that has been glued with an aqueous solution of a formaldehyde-urea reaction product, unlike plywood that has been glued with other thermosetting adhesives, does not need to be subjected to high temperature in a heated press in order to convert the formaldehyde-urea reaction product into the insoluble resin. A heated press is not necessary when an aqueous solution of a formaldehyde-urea reaction product is used as an adhesive, because such an adhesive can be converted into an insoluble resinous bond by the action of an acid hardening agent at ordinary temperatures.

However, failure of the bond has occurred when an aqueous solution of a formaldehyde-urea reaction product has been used as an adhesive for gluing plywood and other articles which have been subjected to dry atmospheric conditions. Under such conditions, failure of the glue line has been experienced, for example, with cold-pressed fir plywood and hot-pressed birch plywood glued with an aqueous solution of a formaldehyde-urea reaction product.

The principal object of the invention is to provide an improved formaldehyde-urea adhesive that obviates bond failure under dry atmospheric conditions. More specific objects and advantages are apparent from the description, which merely discloses and illustrates the invention and is not intended to impose limitations upon the claims.

An adhesive embodying the present invention comprises a substantially stable suspension of up to about 1 part of cellulosic particles in an aqueous solution containing 3 parts of a formaldehyde-urea reaction product, and, after being applied and hardened, produces a bond that is highly resistant to dry atmospheric conditions. The term "substantially stable suspension" is used herein to designate one in which the suspended particles do not appreciably settle out for several hours after the suspension has been prepared. Whenever parts are mentioned herein, the parts are by weight.

It is believed that a substantially stable suspension of cellulosic particles in an aqueous solution of a formaldehyde-urea reaction product has never heretofore been prepared. An aqueous solution of a formaldehyde-urea reaction product containing cellulosic particles cannot be used as an adhesive unless it is a substantially stable suspension of the particles. If the suspension is not substantially stable, the particles form gummy masses by settling out, and such gummy masses make it impossible to apply the liquid as an adhesive. An aqueous solution of a formaldehyde-urea reaction product, in order to act as an adhesive, must be spread in a uniformly thin film upon the surface to be glued, and such a film cannot be produced from a solution containing gummy masses or lumps.

When an attempt is made to glue two surfaces together by means of a layer of aqueous formaldehyde-urea glue, which at any point is of substantial thickness instead of being a mere film, the glue layer, wherever it is of substantial thickness, disintegrates upon drying out instead of forming a bond. In order that an aqueous solution of a formaldehyde-urea reaction product containing cellulosic particles may be spread in a uniformly thin film, it must not only be a substantially stable suspension, but must also contain not more than about 1 part of cellulosic particles to every 3 parts of formaldehyde-urea reaction product.

A substantially stable suspension of particles of any cellulosic material in a solution of a formaldehyde-urea reaction product can be employed, but no more than about 1 part of cellulosic particles can be used for every 3 parts of formaldehyde-urea reaction product. There is no lower limit to the proportion of cellulosic particles except that the amount of cellulosic particles should be at least appreciable (for example, about 1 part of cellulosic particles for every 100 parts of formaldehyde-urea reaction product). The fine suspended particles may consist of wood flour, paper pulp, wood pulp, alpha-cellulose or any other cellulosic material, but wood flour is preferred. When wood flour is used as the cellulosic material, the preferred proportion of wood flour is from about 1 to about 6 parts of wood flour for every 30 parts of formaldehyde-urea reaction product.

If desired, hydrated cellulosic material may be employed. Cellulosic material can be hydrated by keeping it under water at a temperature approximating the boiling point for an hour or more. Hydrated cellulosic particles tend to stay in suspension somewhat better than non-hydrated cellulosic particles. The use of hydrated cellulose particles also tends to make the suspension somewhat smoother and easier to spread. On the other hand, the adhesive is more viscous when hydrated cellulosic particles are employed. Such greater viscosity makes it possible to use more water in the adhesive without making it so thin as to soak into the wood or other material to be glued instead of remaining in the glue line.

Thickeners or extenders such as wheat flour and rye flour may be used in the adhesive, together with the suspended cellulosic particles. Such extenders, which consist of starch or protein rather than cellulose, do not perform the same function as the suspended cellulosic particles, but merely serve to thicken the adhesive. The purpose of thickening the adhesive is to permit it to be diluted with water to a considerable extent without rendering it so thin that it soaks into the material to be glued.

The principal function of such extenders is to cheapen the adhesive, because the strength of the bond is reduced in proportion to the amount of extender employed. In contrast, the suspended cellulosic particles in the adhesive of the present invention do not impair the strength of the bond, but effect an important improvement by preventing failure of the bond under dry atmospheric conditions. The proportion of water in the solution may be varied widely in accordance with the conditions of application, such as the nature and amount of extenders, the viscosity desired, and the necessity for cheapening the product.

Unless the cellulosic particles in the adhesive are less than about .02 mm. in diameter, they form gummy masses and make it impossible to spread the adhesive. Improvement over prior adhesives in the resistance of the bond to dry atmospheric conditions cannot be obtained by using particles of greater size than .02 mm. The preferred particle size is 1 or 2 microns.

The present adhesive, like other formaldehyde-urea adhesives, is supplied with an agent for hardening the formaldehyde-urea reaction product. The hardening agent may be incorporated in the solution just before the adhesive is applied, or a solution of the hardening agent may be applied to one of the surfaces to be glued while the adhesive is applied to the other. When the two surfaces to which the two solutions have been applied are brought together, the agent that has been applied to one surface acts to harden the formaldehyde-urea reaction product that has been applied to the other surface.

The hardening agent is a substance such as ammonium chloride or ammonium bromide that renders the adhesive acid and thus causese it to harden. The quantity of hardener used is simply an amount sufficient to cause the hardening to take place with the desired rapidity.

After an adhesive embodying the invention has been incorporated with a hardening agent and applied, the assembled surfaces to be glued can be held at ordinary temperatures while the adhesive hardens. Plywood panels and similar articles may be placed under pressure while the adhesive hardens. A heated press can be used to secure quick hardening of the adhesive, or plywood panels, after being clamped together, may be stored at an elevated temperature to hasten the hardening.

If desired, a dry mixture of the cellulosic particles with a water-soluble formaldehyde-urea reaction product may be prepared which, upon the addition of water, forms an aqueous adhesive embodying the invention. Vacuum drum-drying or any other desired method of drying may be employed to obtain the formaldehyde-urea reaction product in dry form, but spray-drying is preferred. It is more economical to ship the material in dry form than to ship the material with the water in it.

If the suspension or the dry mixture containing the cellulosic particles is to be stored for a substantial period of time or shipped a substantial distance, the material should not be appreciably acid. The adhesive will not keep indefinitely in an acid condition, but will harden and become insoluble. A non-acid adhesive can be obtained by neutralizing the material after the wood flour has been added, or by adding neutralized wood flour to a neutralized formaldehyde-urea reaction product.

*Example*

A water-soluble formaldehyde-urea reaction product suitable for use in the present adhesive may be prepared as follows: 1 mol of urea is added to a 37 per cent aqueous solution containing 2 mols of formaldehyde that has been brought to pH 4.5–5.0 by means of sodium hydroxide. The solution is then gently refluxed long enough (about 1 hour) to carry the formaldehyde-urea reaction to the desired stage, after which the solution is neutralized. It may then be diluted with water, or evaporated under vacuum to the desired concentration.

1 part of wood flour particles having a diameter of 1 or 2 microns for every 5 parts of formaldehyde-urea condensation product is added to the solution at any desired stage. These particles remain in suspension indefinitely without settling out. If the wood flour is introduced at the time of the addition of the urea or shortly thereafter, it becomes hydrated during the refluxing operation.

After 1 part of ammonium chloride has been added for every 100 parts of formaldehyde-urea reaction product, the adhesive can be applied.

Various embodiments of the invention may be devised to meet various requirements.

Having described our invention, we claim:

1. An adhesive that, when applied and hardened, produces a bond of superior resistance to dry atmospheric conditions, comprising a substantially stable suspension of up to about one part of cellulosic particles, substantially all of which are less than about .02 millimeter in diameter, in an aqueous solution containing three parts of a formaldehyde-urea reaction product.

2. An adhesive that, when applied and hardened, produces a bond of superior resistance to dry atmospheric conditions, comprising a substantially stable suspension of up to about one part of hydrated cellulosic particles, substantially all of which are less than about .02 millimeter in diameter, in an aqueous solution containing three parts of a formaldehyde-urea reaction product.

3. An adhesive that, when applied and hardened, produces a bond of superior resistance to dry atmospheric conditions, comprising a substantially stable suspension of up to about one part of wood flour particles, substantially all of which are less than about .02 millimeter in diameter, in an aqueous solution containing three parts of a formaldehyde-urea reaction product.

4. An adhesive that, when applied and hardened, produces a bond of superior resistance to dry atmospheric conditions, comprising a substantially stable suspension of from about one to about six parts of wood flour particles, substantially all of which are less than about .02 millimeter in diameter, in an aqueous solution containing thirty parts of a formaldehyde-urea reaction product.

5. A mixture comprising three parts of a water-soluble formaldehyde-urea reaction product and up to about one part of cellulosic particles, substantially all of which are less than about .02 millimeter in diameter, said mixture, upon the addition of water, being capable of forming a substantially stable suspension of said particles in the solution of said reaction product, which suspension, when applied as an adhesive and hardened, produces a bond of superior resistance to dry atmospheric conditions.

6. A mixture comprising three parts of a water-soluble formaldehyde-urea reaction product and up to about one part of hydrated wood flour particles, substantially all of which are less than about .02 millimeter in diameter, said mixture, upon the addition of water, being capable of forming a substantially stable suspension of said particles in the solution of said reaction product, which suspension, when applied as an adhesive and hardened, produces a bond of superior resistance to dry atmospheric conditions.

7. A mixture comprising thirty parts of a water-soluble formaldehyde-urea reaction product and from about one to about six parts of wood flour particles, substantially all of which are less than about .02 millimeter in diameter, said mixture, upon the addition of water, being capable of forming a substantially stable suspension of said particles in the solution of said reaction product, which suspension, when applied as an adhesive and hardened, produces a bond of superior resistance to dry atmospheric conditions.

WILLIAM C. DEARING.
KENNETH D. MEISER.